July 12, 1932.   A. B. B. HARRIS   1,867,316
SPILLWAY CONTROL METHOD AND APPARATUS
Filed Nov. 1, 1929   2 Sheets-Sheet 1
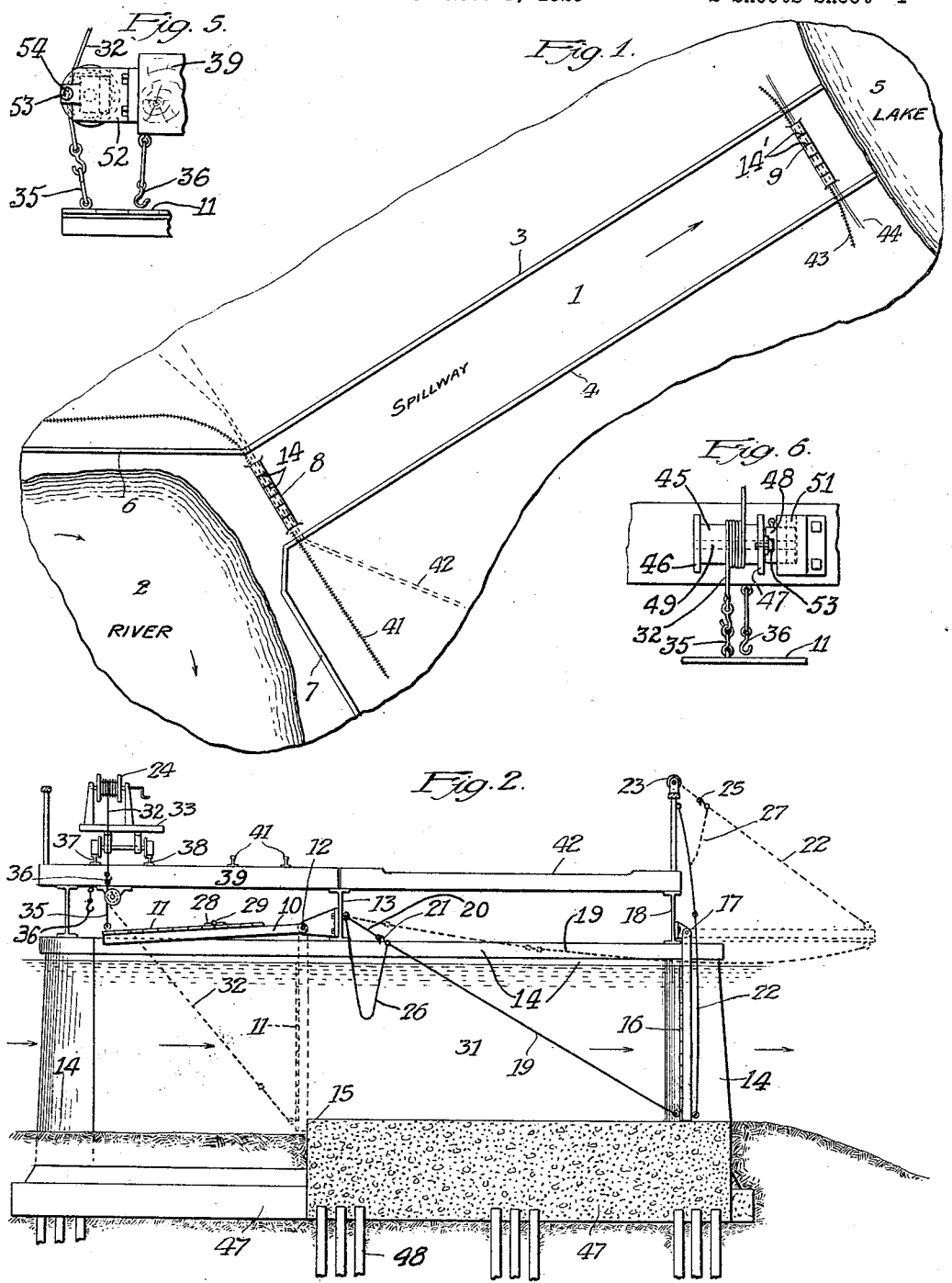
Inventor
Alexander B. B. Harris
By Wilson, Dowell, M°Canna & Rehm
Att'ys July 12, 1932.  A. B. B. HARRIS  1,867,316
SPILLWAY CONTROL METHOD AND APPARATUS
Filed Nov. 1, 1929  2 Sheets-Sheet 2
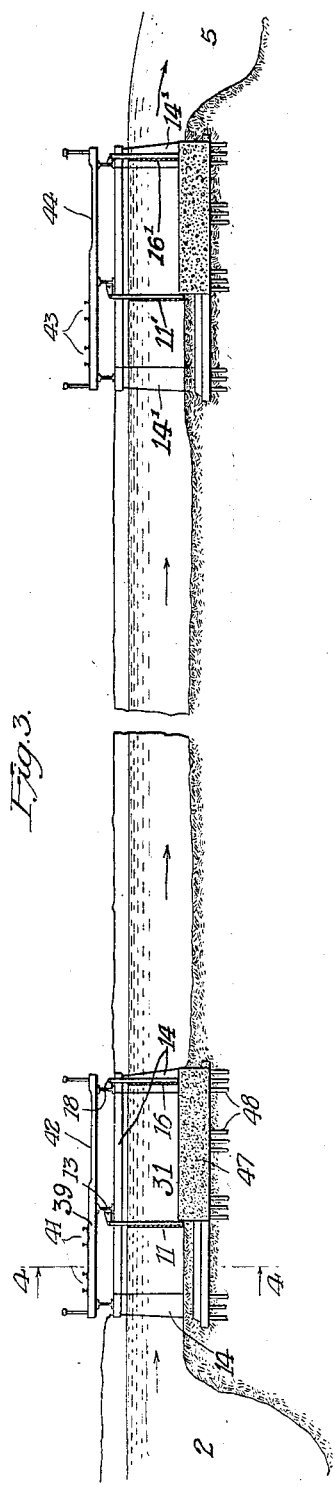
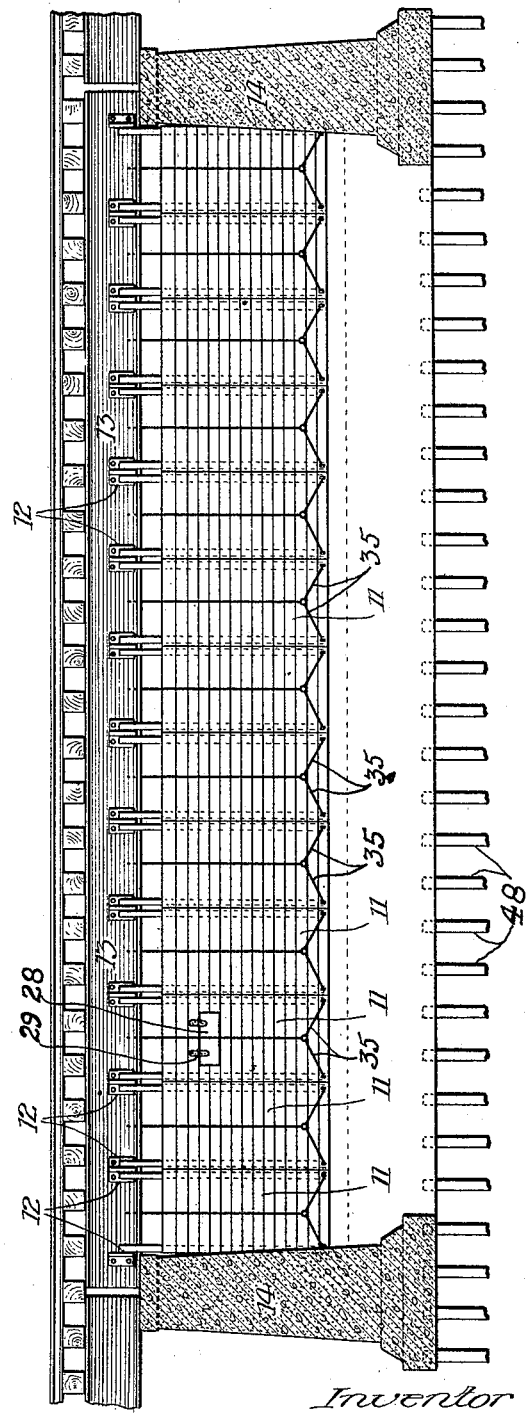
Inventor
Alexander B.B. Harris
By Wilson, Lowell, McCanna & Rehm
Attys Patented July 12, 1932

1,867,316

UNITED STATES PATENT OFFICE

ALEXANDER B. B. HARRIS, OF CHICAGO, ILLINOIS, ASSIGNOR OF ONE-FOURTH TO FRANK H. T. POTTER, OF CHICAGO, ILLINOIS

SPILLWAY CONTROL METHOD AND APPARATUS

Application filed November 1, 1929. Serial No. 403,926.

This invention pertains in general to methods and means for controlling the flow of water between two points and is especially useful in controlling the flow of flood waters.

The features of this invention are applicable to a variety of uses, but for the purpose of describing the invention its use for controlling flood waters will be particularly described and illustrated. Where a natural stream or river is subjected to large seasonal floods the escape of the flood waters beyond the river banks in populated or cultivated districts is apt to cause such serious damage that there has arisen from necessity the practice of building levees along the river banks to confine the water to its proper course past the regions where its escape would do the most serious damage and to permit it to escape its banks elsewhere where less damage would occur, if it is not possible to conduct all of the flood water into some natural larger body of water and to disperse it therein. A multitude of reasons which need not be detailed here, however, often make it highly desirable to relieve the pressure of the flood stage from the levees even before the water can be carried as far as the above mentioned natural safe outlets. In such cases it will often be found that, by utilizing the principles of this invention, part of the flood water can be diverted from the main stream through a relatively narrow channel subject to positive control to some point remote from the main stream where it may be discharged and allowed to flow naturally out over the countryside where little damage will result from such overflow, and if erosion in the channel must be avoided this invention provides the means for preventing such erosion.

Among the objects of this invention are to provide methods and apparatus for diverting flood waters under positive control through narrow channels for the above mentioned purposes including the purpose of preventing erosion in the channel; to provide means for controlling the water level in such channels or spillways; to provide control gates for use in connection with such a spillway which are adapted for manual manipulation and require no expensive hoisting machinery; to provide gates normally held closed by water pressure and means for equalizing pressure on both sides of such gates to permit them to be opened with small expenditure of force; to provide water control gates which can be quickly closed by the movement of the water and gates which may be quickly opened by the movement of the water; to provide a flood control system which will permit large volumes of water per unit of time to be safely moved through given areas without erosive effect and without the depositing of silt. Various other objects, advantages and capabilities of the invention are inherently possessed by it and should later become apparent.

The illustrated embodiment of the invention is intended to be applied to a flood control problem such as the following. A river already having high leeves and dangerously high flood stages passes through valuable farm land or improved real estate extending for perhaps a few hundred yards or a few miles laterally from the river bank. But laterally beyond this valuable region where the nature and value of the terrain demand that flood waters be not allowed to flow therethrough with erosive effect there exists possibly a lake or some open country of lesser commercial value onto which some of the excessive flood waters could be discharged and dispersed during the flood stage without too great damage.

In order to cope with the above described situation this invention would be employed and operated, briefly, in the following manner. A relatively narrow channel such as is shown in Figs. 1 and 3 will be constructed leading from the bank of the river through the valuable farm land to an open countryside of relatively little value, or to a lake possibly. Preferably, gates will be placed at each end of the channel and as the flood stage rises the gates at the river will be slightly opened while the gates at the discharge end of the channel remain closed. The channel will then fill gradually without such turbulence as would cause erosion and when a desired depth is obtained in the channel the inlet gates will be opened further and the outlet gates will also be opened. The water is then permitted to flow continuously through the channel under the control of both sets of gates, or under control of the discharge gate only, permitting the necessary escape of flood water yet regulating its depth in the channel to prevent erosion therein. The river level can thus be lowered to and under the variable control of the gates regulatably maintained at a safe height. When the flood stage has passed the inlet channel gates may be closed, and the channel drained.

An embodiment of the invention for effecting the above purpose is illustrated in the drawings in which:

Fig. 1 is a diagrammatic plan view showing the channel in its relation to the river and to the discharge area, Fig. 2 is a vertical sectional view of a pair of gates which may be installed at either end of the channel or spillway, Fig. 3 is a central sectional view of the channel or spillway gates, Fig. 4 is a vertical section on the line 4—4 of Fig. 3, Fig. 5 is a fragmentary view showing the end elevation of a rope brake which may be used either for raising or lowering the gates, particularly the upstream gates, and Fig. 6 is a front elevation of the same rope brake.

The spillway generally indicated as 1 extends from the river 2 between levees 3 and 4 to a point where the flood waters may be freely discharged with relative safety such, for example, as in the lake 5 partially indicated in Fig. 1. Along the banks of the river the usual levees 6 and 7 are shown. At the entrance of the spillway there is shown in Figs. 1 and 3 a combination bridge and system of gates which may be termed the wier 8, while at the discharge end of the spillway there is shown another combination bridge and system of gates which may be called the wier 9.

The gate construction which I prefer to use in this embodiment of the invention is suitable for regulating the flow of a stream of water of any width such as a few yards in width or even one mile or more in width. It consists of a plurality of relatively narrow gates each hinged independently of the others at its top and capable of being swung up to open or down to closed position independently of any of the other gates.

I prefer that the inlet gate be composed in reality of two sets of gate sections, the upstream set of gate sections shown in Fig. 4 comprising the narrow gate sections 11 each having its own hinges 12 of any well known and suitable construction connected to the top of each gate section and to an overhead framework such as the I-beam 13 which extends transversely across the spillway between the parallel piers 14 and 14' indicated diagrammatically in Fig. 1 and better shown in Figs. 2 and 4. These piers should extend from the upstream side of each wier to its downstream side and should be spaced sufficiently far apart to make sure that logs and tree trunks floating with the flood may pass readily between the piers whenever the gates are open. The upstream gate sections are adapted to be opened by swinging them in an upstream direction as shown in Fig. 2, and to be held in closed position by the pressure of the water on their upstream sides pressing their lower margins against an abutment shoulder 15 formed on the bed of the spillway. Each gate section may be constructed in any suitable manner from a plurality of boards fastened to vertically extending beams 10 of wood or steel, as may be desired.

The downstream gate sections forming a part of the inlet wier 8 comprise relatively narrow gate sections 16 similar to the gate sections 11, and each hinged at its top by means of the hinge 17 to the I-beam 18. However, the downstream gate sections are mounted so that they swing upwardly with the spillway current rather than against it, as is indicated in Fig. 2, and each is held in closed position by means of a cable 19 secured thereto in the manner shown and to the I-beam 13 by means of the short cable 20 and the hook 21. Each section may be opened by disengaging the hook 21 and permitting the force of the water to swing the gate section outwardly and upwardly. Each gate section 16 may thereafter be raised to full open position by means of a cable 22 which can be pulled up by hand or which may be passed around a pulley 23 and wound up on a windlass such as the windlass 24, for example. Each of the cables 19 and 22 are preferably provided with the respectively shown hooks 21 and 25 and extension loops 26 and 27 which permit the cables to be hooked in a shortened position or unhooked and allowed to extend to the extended cable positions shown in Fig. 2.

The upstream gate sections when closed are normally held closed with great pressure during flood stages by the water in the river, hence to open them by raising them against that pressure would require a great amount of force, which is rendered unnecessary in accordance with my invention. When it is desired to open the upstream gate sections the downstream gate section 16, if not already closed, will be closed and hooked in closed position. With all of the gate sections 11 and 16, which are between each pair of piers 14 closed, there will be formed by the gate sections and the longitudinal sides of each pair of piers rectangular chambers similar to the chamber 31, at that time not containing any water. A relatively small trap door 28 will be provided in each chamber preferably in one or more of the gate sections 11 and hingedly connected thereto by a hinge 29 and of small enough size so that one man can readily open it by engaging a pole with a hook thereon into any suitable ring (not shown) carried by the trap door. This trap door, or a plurality of them, or some equivalent, will then be opened to permit a small amount of the water to flow from the river into one or more of the chambers 31 in the wier 8. Eventually the water level in the chambers which are being flooded will become the same as that in the river and pressure will then be equalized on both sides of the upstream gate sections 11 in those chambers. It is now a simple matter to open these upstream gate sections, raising each one separately by means of its cable 32 which is passed around the windlass 24. It will be noted that the windlass 24 is mounted upon a suitable truck 33. When each upstream gate section has been pulled up by means of its cable it will be hooked in open position in any suitable manner as, for example, by means of its short loop 35 and a suitable hook 36. These latter details of construction are, however, subject to great variation. The truck carrying the windlass may be rolled along the rails 37 and 38 of a railroad track which may be carried on top of the gate construction on a road bed 39 and each gate section 11 in turn pulled up by means of the windlass until the operator has opened all or as many of upstream gate sections in the flooded chambers as he estimates will be required for diverting enough water from the river to counteract the effect of the flood.

At this time all of the gate sections or at least all of the downstream gate sections 16' in the discharge wier 9 at the lower end of the spillway are still closed, while the chamber 31 is filled to the existing flood level in the river. One or several of the downstream gate sections 16 in the flooded chambers in the inlet wier 8 will now be opened, permitting a small stream of water to flow from the river through the chamber 31 into the spillway, the size of the stream being regulated so that no substantial erosion, or none at all, will occur in the spillway, this small amount of flow being continued until the water reaches a depth throughout the entire spillway calculated to be sufficient to prevent erosion of the spillway bed when the lower gates are later opened. Since most of the serious floods occur in land which is quite level, as for example in some of the large river valleys of the United States, it will usually be possible to construct a spillway which from its inlet to its outlet does not have very much fall, consequently the spillway can be filled to a considerable average depth between its ends, for example, perhaps fifteen to twenty feet. When the predetermined depth, sufficient to prevent erosion at a calculated velocity of the spillway current, has been obtained the gates in the discharge wier 9 will then be opened. Since the same combination of gates is preferably employed in the wier 9 that are employed in the wier 8 these gate sections will be opened in the same manner in which the gate sections 11 and 16 of the wier 8 were opened. That is, the upstream gate sections 11 and 11' are opened prior to the opening of the downstream gate sections 16 and 16' which are associated with them in the equalizing chambers 31. Since the gate sections 16 and 16' will be opened by the pressure of the water itself no great amount of force need be expended for the final opening and locking of the gates which determine the amount of flood water permitted to escape through the spillway.

It must now be apparent that the velocity and volume of water permitted to flow through the entire spillway can easily be regulated by means of the gate sections in the wiers and a safe depth, no matter what the volume or velocity is, may be maintained over the spillway bed so that the current may not cause erosion of the bottom of the spillway.

Should a second rise in the flood unexpectedly occur an additional number of gates in the upper and lower wiers, preferably in units between the parallel piers 14 and 14' may be opened to admit a greater flow of water through the spillway.

As the flood stage falls, in order to maintain the water depth in the spillway sufficient to prevent erosion some of the gates may be closed, particularly in the discharge wier. The closing of the gate sections is easily attended to by one man who can merely unhook as many of the gate sections 11 as are necessary and permit the current of water to swing them down into closed position, thus throttling the discharge of water from the spillway.

It will be perceived that by maintaining a considerable depth of water in the spillway more water can be safely moved per minute without erosion than could be moved through an uncontrolled spillway or through a shallow spillway. Also a narrow but deep spillway will obviously not occupy as much land as would a broad and shallow spillway of equal capacity. Furthermore, if railroads and highways must cross the spillway it will be cheaper to bridge the narrow deep spillway. This invention makes it possible to combine such bridges with the spillway control gates, thus effecting further economy.

The inlet and discharge gate systems are preferably alike, but it should be apparent that exact duplication is not essential to the successful use of the invention. In the drawings each wier is shown as including a bridge, the upstream bridge carrying the rails of a double track railroad 41 and also providing a vehicle roadway 42, while the downstream bridge supports a double track railway 43 and a vehicle roadway 44. Each bridge is amply supported on the I-beams extending across the piers 14 and 14'. A firm foundation for these piers may be provided by forming a reinforced concrete bed 47 interlocked with piles 48.

It should be understood that the principles of this invention may be employed in the conveying of waters other than flood water and that it is adaptable to many conditions in the control of flood waters. In some cases where the spillway must be built across tillable land and the excess of flood water carried a considerable distance to some point where it is safe to discharge it freely over the countryside or into some other body of water, this invention makes possible the entire prevention of erosion in the spillway bed. Conseqently as soon as the flood stage has passed, the tillable land lying in the bed of the spillway may be put under cultivation, immediately, or if it is already bearing a growing crop the crop will not have been destroyed, at least by erosion, and it may resume growing as soon as the water is drained off. Furthermore, since erosion in the spillway bed can be prevented there need be no transfer of soil from the spillway bed onto the land beyond the end of the spillway.

Since, by means of this invention the operator can regulate both the depth and current velocity in the spillway it will be an easy matter for him to maintain a high current velocity in a safe depth of water, not only avoiding erosion but as well avoiding the depositing of silt in the spillway. Not only is dredging of the spillway made unnecessary but should the spillway contain tillable land none of its crops need be buried under silt deposits.

Should it be desired, however, to keep a body of water in the spillway at all times, even between flood periods, this also is possible through use of this invention.

Should it be desired to use but half the number of gates which are shown in the drawings for the control of the spillway such a construction would include an inlet wier having only the gate sections which open against the stream and a discharge wier at the other end of the spillway having only gate sections which open with the stream, which would be in principle about the same as extending the length of the chamber 31 to form the entire spillway. The operation of the gates in such a case will be readily understood in view of the foregoing disclosure.

If a spillway must be constructed in terrain which has a considerable slope one or more intermediate sets of gates could be installed in the spillway in order to keep at all places in the spillway a depth sufficient to prevent erosion. Immediately adjacent the discharge side of such gates it might be necessary to install concrete aprons, or their equivalents, to prevent erosion at such points. Such a spillway system would employ, however, the principles of this invention.

One of the outstanding features of this invention is its low cost of operation. Many of the wiers heretofore employed required powerful and costly hoisting machinery for operating the gates, but the gate sections disclosed herein may all be operated by hand or at least should require no more than portable motors of a few horse power for their operation. The saving in operating equipment is of great importance due to great width of some spillways which may be built and because of the relatively infrequent use of such equipment.

Instead of the windlass 24 operated by hand or by motor power, shown in Fig. 2, I may employ a rope brake comprising a drum 45 disposed between two flanges 46 and 47. This rope brake, briefly, is provided with a supporting hub 48 which carries an axle 49 about which the drum rotates. The hub 48 may be secured to the railroad bed 39 in any suitable manner. However, I prefer that the hub 48 have projecting tongues which slidably fit down into a T-slot 51 carried by a permanently located bracket 52. Thus each rope brake may be removably engaged with the permanent bracket and taken from gate section to gate section as they are opened, thus minimizing the amount of equipment required. When a gate section 11 is to be lowered the cable 32 will be engaged with the short loop 35 and the cable will be wound three or four times about the drum 45. The drum is at this time held against rotation about its axis by means of a pin 53 extending through a suitable hole in the stationary hub 24 and engaged with a hole 54 provided in the flange 47. While the drum is thus held against rotation the operator may permit the cable 32 to slip around the drum, lowering the gate section 11 slowly by hand, resisting the action of gravity and also the force of the current of water if any current then be flowing. Thus one man may easily close a gate section 11 even when the current is flowing without danger of smashing the gate section. The same rope brake may also be used for raising the gate section 11, by removing the pin 53 permitting the drum to rotate, thus using it as an ordinary pulley. It should be understood that this rope brake may be used in combination with the windlass or in place of it or in combination with some other hoisting apparatus.

Various modifications of the invention for this and other purposes may later be devised which will, however, remain within the spirit and scope of the invention.

Having shown and described my invention, I claim:

1. A method of initiating and controlling water flow through a confined spillway previously substantially empty and having an earth bottom comprising admitting water into said spillway at a rate insufficient to erode said bottom and accumulating it therein until a predetermined water level is obtained, and thereafter permitting a continuous flow of water therethrough while maintaining a sufficient depth and rate of flow of water to prevent erosion therein by partially checking the outflow of water.

2. A method of initiating and controlling water flow through a confined spillway previously substantially empty and having an earth bottom comprising admitting water into said spillway at a rate insufficient to erode said bottom and accumulating it therein until a predetermined water level is obtained, and thereafter partially opening both ends of the spillway and permitting a continuous flow of water therethrough while maintaining a sufficient depth and rate of flow of water to prevent erosion therein by partially checking the outflow of water.

3. A method of controlling water flow through a confined spillway having an earth bottom comprising regulating the admission of water into the spillway and separately regulating its discharge therefrom in such a manner as to maintain a sufficient water depth throughout the spillway proportioned with relation to the current velocity to avoid erosion of the spillway floor.

4. A method of preventing erosion therein during use of an intermittently used spillway comprising admitting water into the spillway and restricting discharge therefrom until a desired depth is obtained, and thereafter admitting and discharging approximately equal quantities of water simultaneously while maintaining a depth and rate of flow therein sufficient to prevent erosion of the bottom of the spillway.

5. A method of preventing erosion therein during use of an intermittently used spillway comprising admitting water into the spillway and confining it therein until a desired depth is obtained, and thereafter admitting water to and discharging it from the spillway simultaneously while maintaining a depth and rate of flow therein sufficient to prevent erosion of the bottom of the spillway.

6. A method of initiating water flow and thereafter delivering additional water from a main body of water through a spillway having side walls and an earth bottom to and past a predetermined point comprising regulatably allowing water to flow from said main body into the spillway at a rate insufficient to cause erosion of said bottom and accumulating the water therein until a predetermined depth of water is obtained generally in the spillway, and thereafter regulating the flow of water into and out of the spillway to maintain therein a depth and rate of flow sufficient to prevent substantial erosion of the bottom of the spillway.

7. A method of variably controlling different volumes of water flow through a spillway of fixed width having a soil floor comprising conducting a continuous flow of water through the spillway and regulatably varying its discharge therefrom to provide at all times a depth of water in the spillway so related to the velocity therein as to prevent erosion of the spillway floor at any of the several current velocities made necessary by the variation in volume of water flow.

In witness of the foregoing I affix my signature.

ALEXANDER B. B. HARRIS.